(12) United States Patent
Yagyu et al.

(10) Patent No.: US 7,375,900 B2
(45) Date of Patent: May 20, 2008

(54) VARIABLE POWER OPTICAL SYSTEM AND IMAGE PICKUP APPARATUS

(75) Inventors: Genta Yagyu, Nishinomiya (JP); Tetsuo Kohno, Suita (JP); Shinji Yamaguchi, Osaka (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/513,657

(22) Filed: Aug. 31, 2006

(65) Prior Publication Data

US 2007/0053069 A1    Mar. 8, 2007

(30) Foreign Application Priority Data

Sep. 8, 2005    (JP)    ............................. 2005-260449

(51) Int. Cl.
G02B 15/14    (2006.01)
H04N 5/262    (2006.01)
G03B 17/00    (2006.01)

(52) U.S. Cl. ...................... 359/680; 359/682; 359/689; 359/691; 348/240.3; 396/72

(58) Field of Classification Search ............ 348/240.3; 359/676, 680, 681, 682, 686, 691; 396/72
See application file for complete search history.

(56) References Cited

U.S. PATENT DOCUMENTS 6,728,482 B2 *   4/2004   Hagimori et al. ............. 396/72
2005/0285970 A1 * 12/2005   Yamaguchi et al. ......... 348/363

FOREIGN PATENT DOCUMENTS

| JP | 2002-341244 A | 11/2002 |
| JP | 2003-43354 A | 2/2003 |
| JP | 2004-37924 A | 2/2004 |
| JP | 2005-84151 A | 3/2005 |

* cited by examiner

Primary Examiner—David N. Spector
(74) Attorney, Agent, or Firm—Sidley Austin LLP

(57) ABSTRACT

An object of the present invention is to provide a compact size variable power optical system capable of producing a high quality image. The variable power optical system comprises a plurality of lens groups for forming an optical image on an image surface of an image pickup device. Among the plurality of lens groups, the first lens group, which is disposed in the most subject side has a negative refraction power, includes at least a lens having a negative refraction power and a reflective optical element for bending the optical axis. When varying the variable power, the axial distance between the first lens group and the image surface varies. When Nd denotes the refraction power of the lens having negative refraction power at d-line, the refraction power satisfies the conditional formula Nd>1.81.

14 Claims, 10 Drawing Sheets

VARIABLE POWER OPTICAL SYSTEM AND IMAGE PICKUP APPARATUS

This application is based on Japanese Patent Application No. 2005-260449 filed on Sep. 8, 2005, in Japanese Patent Office, the entire content of which is hereby incorporated by reference.

TECHNICAL FIELD

The present invention relates to a variable power optical system used for an image pickup apparatus having an image pickup device for converting an optical image formed on an image surface of a sensor into electric signals and an image pickup apparatus.

BACKGROUD

In recent years, due to the trend of a higher number of pixel of an image sensor, the demand for the image pickup optical system having a low manufacture error, which cannot be easily influenced of the manufacturing error is growing while maintaining a higher design optical performance. Furthermore, the image pickup optical system, which allows a whole camera to be design in a thin shape, is demanded from a viewpoint of portability and appearance.

In response to this demand described above, Japanese Patent Applications Open to Public Inspection Nos. 2002-341244, 2003-43354 and 2004-37924 disclosed image pickup optical systems, which have achieved to realized thin-shaped cameras by shorting the depth of the camera body by adopting a means for bending the light path, such as a prism and a mirror for bending the light path in the image pickup optical system. Japanese Patent Applications Open to Public Inspection Nos. 2002-341244, 2003-43354 and 2004-37924 described above also disclosed image pickup optical systems including a first lens group, which is disposed in the most subject side and has negative refractive power, the first lens group having the least inference of the manufacturing error to the optical performance.

However, the image pickup optical system described above cannot be said that the small image pickup optical systems fully respond to the request of miniaturization while the trend of miniaturization of the whole camera is further progressing, and it has been a subject that a further smaller image pickup optical system is needed.

SUMMARY

An object of the present invention is to provide a variable power optical system having a further smaller shape and high image-quality to solve the problems described above.

In view of forgoing, one embodiment according to one aspect of the present invention is a variable power optical system for forming an optical image of a subject on an image pickup surface of an image pickup device, comprising:

a plurality of lens groups, wherein a first lens group of the plurality of lens groups which is the most nearest to the subject has a negative refractive power, wherein the first lens group includes a reflective optical element for bending a light path and an only lens which is provided on a subject side of the reflective optical element and consists of a single negative lens, wherein an axial distance between the first lens group and the image pickup surface changes when varying a power of the variable power optical system, and a refractive index and an Abbe number of the negative lens satisfy the following relationship:

$Nd > 1.81$ $vd < 40$ wherein:
Nd is the refractive index at d-line of the negative lens;
vd is the Abbe number of the negative lens.

According to another aspect of the present invention, another embodiment is an image pickup apparatus comprising the variable power optical system described above.

According to another aspect of the present invention, another embodiment is a variable power optical system for forming an optical image of a subject on an image pickup surface of an image pickup device, comprising:

a plurality of lens groups, wherein a first lens group of the plurality of lens groups which is the most nearest to the subject has a negative refractive power, wherein the first lens group includes a reflective optical element for bending a light path and at least a negative lens, wherein an axial distance between the first lens group and the image pickup surface changes when varying a power of the variable power optical system, and a refractive index and an Abbe number of the negative lens satisfy the following relationship:

$Nd > 1.81$ $vd < 32$ wherein:
Nd is the refractive index at d-line of the negative lens;
vd is the Abbe number of-the negative lens.

According to another aspect of the present invention, another embodiment is an image pickup apparatus, comprising the variable power optical system described above.

DETAILED DESCRIPTION OF THE PREFERRED EMBODIMENT

The embodiments of the present invention will be described below by using drawings.

Figure 11:
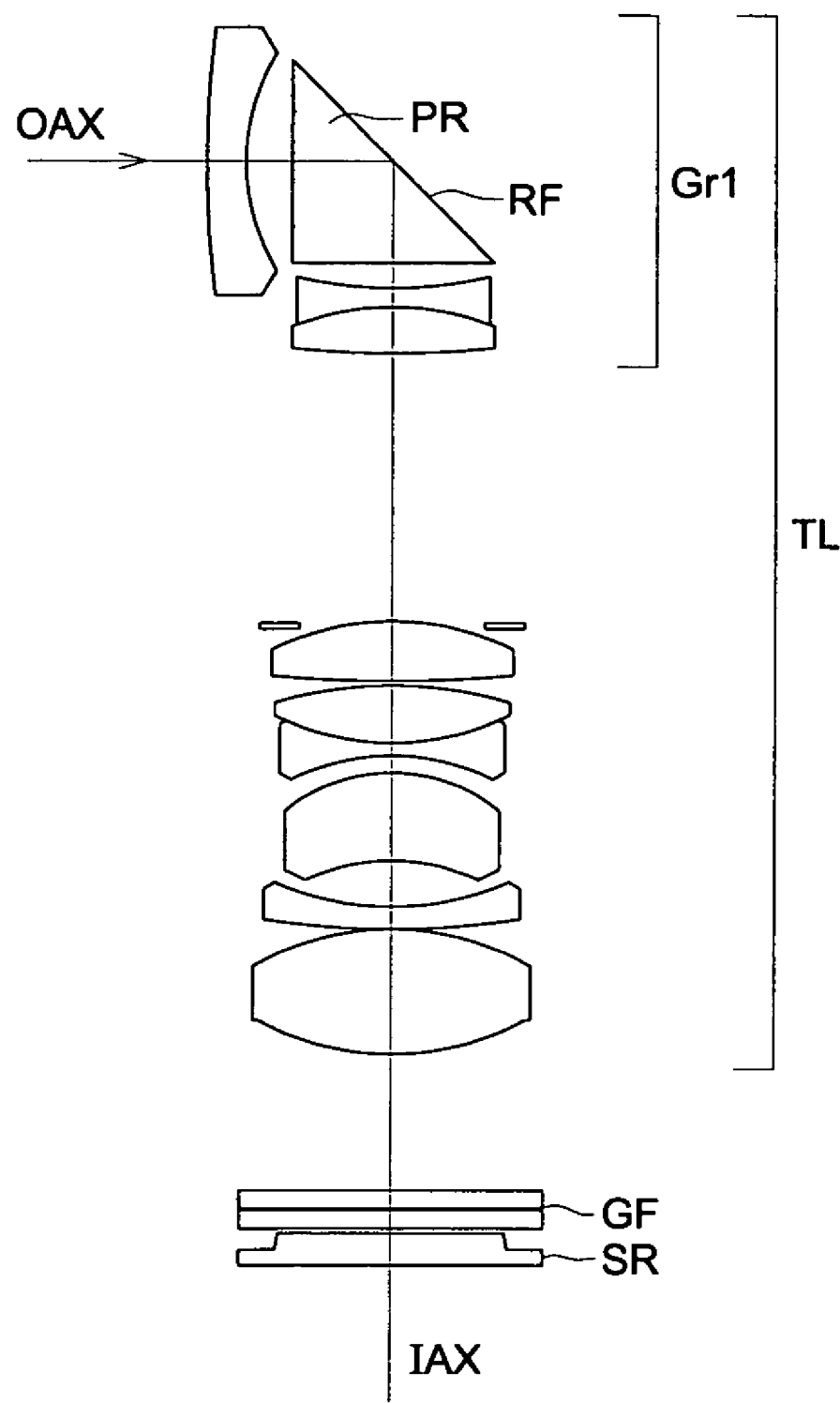
FIG. 11 illustrates a conceptual drawing of an image pickup apparatus including the variable power optical system, which is an example of the embodiment of the present invention.

The image pickup apparatus, which is an embodiment of the present invention comprises a variable power optical system TL for forming an optical image of a subject variably in size, a parallel flat panel GF which works as an optical low pass filter and an IR cut filter, and an image pickup device SR for converting the optical image formed by the variable power optical system TL into electric signals as shown in FIG. 11 in this order from the subject side (subject side). The image pickup apparatus is a main element of a camera, which is internally installed into or externally attached to a digital camera, a video camera, a personal computer, a mobile computer, a cellular phone and a portable information terminal or personal digital assistance (PDA).

The variable power optical system TL comprises a plurality of lens groups including the first lens group Gr1. It is possible to change the size of the optical image by varying the distance between respective lens groups. The first lens group Gr1 has negative refractive power, which is defined by the reciprocal of a focal length and it will be called power. The first lens group Gr1 also includes a reflective optical element PR having a reflective surface RF therein for turn a subject side optical axis OAX substantially by 90° to make an image side optical axis IAX.

Since the optical low pass filter included in the parallel flat panel GF adjusts the space frequency of the image pickup optical system and has a specific cut-off frequency for eliminating color moire generated in the image pickup device, it is not always necessary to provide the optical low pass filter when the space frequency of the image pickup optical system is a specific frequency. The optical low pass filter of the embodiment is a double refraction type low pass filter structured by layering double refraction material such as crystal in which the crystallization axis is adjusted in a predetermined direction and a wavelength plate, which changes polarization surface. With regard to the optical low pass filter, a phase type low pass filter for attaining necessary optical cut-off frequency characteristic by diffraction effects may be adopted.

The IR filter is a filter for lowering the transmittance of light beams having wavelength of more than substantially 700 nm. When photographing a subject by using an image pickup optical system intended to use light beams in a visible light beam range (from a wavelength of substantially 400 nm to a wavelength of substantially equal to 700 nm), since the light beams having wavelength outside of the visible light beam range lower the resolution of the image formed on the image surface, they are harmful. Accordingly, it is preferable to prevent light beams having longer wavelength than the visible light beam range from reaching to the image pickup surface by using the IR cut filter. The transmittance of the light beams having wavelength not more than visible light beam range is low except special glass such as quartz glass. Since the sensitivity of the image pickup device SR for the light beams having wavelength not more than the visible light beam range is low, it is not necessary to provide a filter for lowering the transmittance of the light beams having not more than the visible light beam range.

The image pickup device SR comprises a CCD having a plurality of pixels. The CCD converts the optical image formed on the image surface of the image pickup device SR by the variable power optical system into electric signals. The electric signals generated by the image pickup device SR are processed in a predetermined digital image processing circuit and an image compressing processing circuit according to the necessity of the process and recorded into memory devices (a semiconductor memory, an optical disc). Sometimes, the electric signals are transmitted to other devices through a cable or after being converted into infrared signals. Instead of CCD, CMOS (Complementary Metal-Oxide Semiconductor) may be used.

Figure 12:
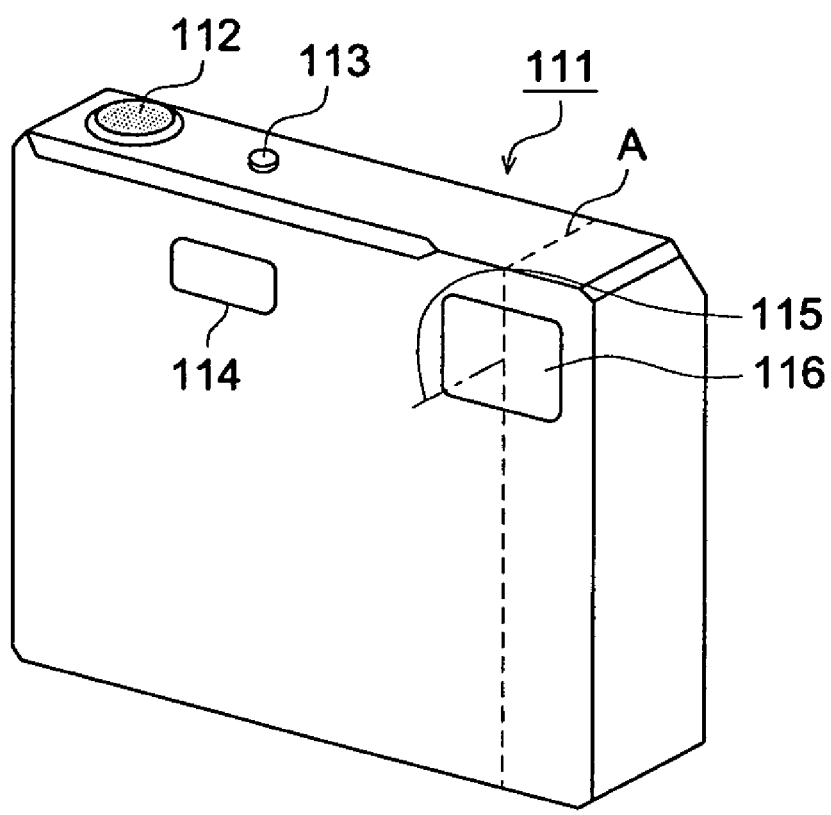
FIG. 12 illustrates a drawing for showing an aspect of the image pickup apparatus of the embodiment of the present invention, which is attached on a digital camera

FIG. 12 illustrates the external appearance of the digital camera including the image pickup apparatus shown as the embodiment of the present invention illustrated in FIG. 11. A digital camera 111 comprises an object window 116 provided in the front surface of a camera body, a flash emitting section 114, a release button 112 provided in the upper surface of the camera body and a power button 113. The object window 116 is designed to open and close. When the object window is opened, the image pickup apparatus is arranged to appear. A numeral 115 denotes an optical axis of the subject-side of the image pickup apparatus. The image pickup apparatus including the variable power optical system illustrated in FIG. 11 is arranged to be placed at the position A as shown in FIG. 12.

FIGS. 1-5 are configuration drawings illustrating lens deployment in the situation where respective variable power optical systems of the embodiments illustrated in FIGS. 1-5 are in the shortest focal length status, which will be called a wide angle end. It is preferable that the variable power optical system of the present invention is arranged to vary the axial distance between the first lens group and the image pickup surface when changing the variable power as shown in the first to the fifth embodiments. Consequently, since the entrance pupil at the wide angle end moves toward the subject side, it becomes possible to make the thickness of the first lens group Gr1 thin and to decrease the thickness of the variable power optical system.

In particular, with regard to the change of the axial distance between the first lens group and the image pickup surface when varying the variable power, it may be allowed to relatively move the respective lens groups which configure the variable power optical system including the first lens group Gr1 while fixing the position of the image pickup device SR located at the image pickup surface position. Or it may be allowed to relatively move the image pickup device SR located at the image pickup surface position and the respective lens groups except the first lens group Gr1 while fixing the position of the first lens group Gr1. In the description below, it is assumed that the image pickup device SR is fixed at the position where the image pickup surface is located. In the each figure, a reflective optical element PR is assumed to be a prism having an internal reflective surface therein, which is illustrated as parallel flat panels and the optical axis is illustrated as a straight line.

Figure 1:
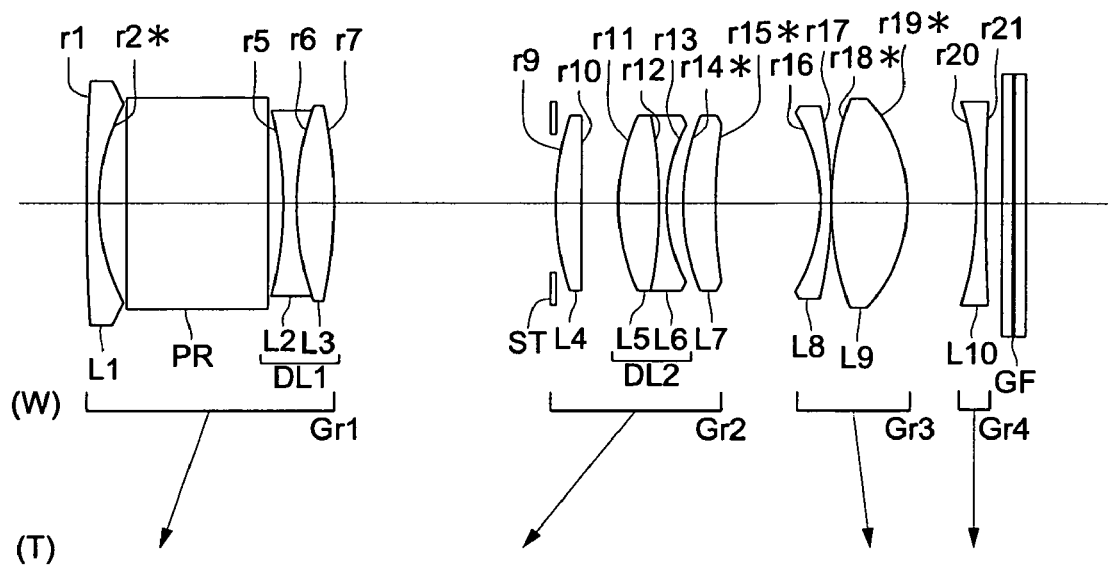
FIG. 1 illustrates the lens configuration drawing of the first embodiment of the present invention (a numeral embodiment 1).

The variable power optical system of the first embodiment illustrated in FIG. 1 comprises the first lens group Gr1 having negative refraction power, the second lens group Gr2 having positive refraction power, the third lens group Gr3 having positive refraction power and the fourth lens group Gr4 having negative refraction power, which are configured as described below. Disposed in this order from the subject side to the image side are the first lens group Gr1 including the first lens element L1 configured by a negative meniscus lens having a convex surface facing toward the subject side, a parallel flat plate corresponding to a prism as a reflective optical element PR, and the first cemented lens element DL1 configured by the second lens element L2 having concave surfaces in both sides and the third lens element L3 having convex surfaces in both sides, the second lens group Gr2 configured by a diaphragm ST, the fourth lens element L4 having convex surfaces in both sides, the second cemented lens DL2 including the fifth lens element LD5 having convex surfaces in both sides and the sixth lens element L6 having concave surfaces in both sides, and the seventh lens element L7 having positive meniscus shape having a convex surface facing toward the subject side, the third lens group Gr3 configured by the eighth lens having a negative meniscus shape and a concave surface facing toward the subject side and the ninth lens element L9 having convex surfaces in both sides and the fourth lens group Gr4 configured by the tenth lens element having concave surfaces in both sides. Further, a parallel flat plate GF corresponding to an optical low pass filter and an IR cut filter is disposed at the image side of the fourth lens group Gr4.

This variable power optical system is arranged to almost monotonously move the first lens group Gr1 toward the subject side, to almost monotonously move the second lens group Gr2 together with a diaphragm ST disposed at,.the most subject side toward the subject side, to almost monotonously move the third lens group Gr3 toward the image side when changing the variable power from the most shortest focal length status (W) to the most longest focal length status (T) while the fourth lens group Gr4 and the parallel flat plate GF are fixed against the image pickup surface.

Among the surfaces of the lens elements, the image side surface of the first lens element, the both surfaces of the seventh lens element L7 and the both sides of the ninth lens element L9 respectively have aspheric surface shapes.

Figure 2:
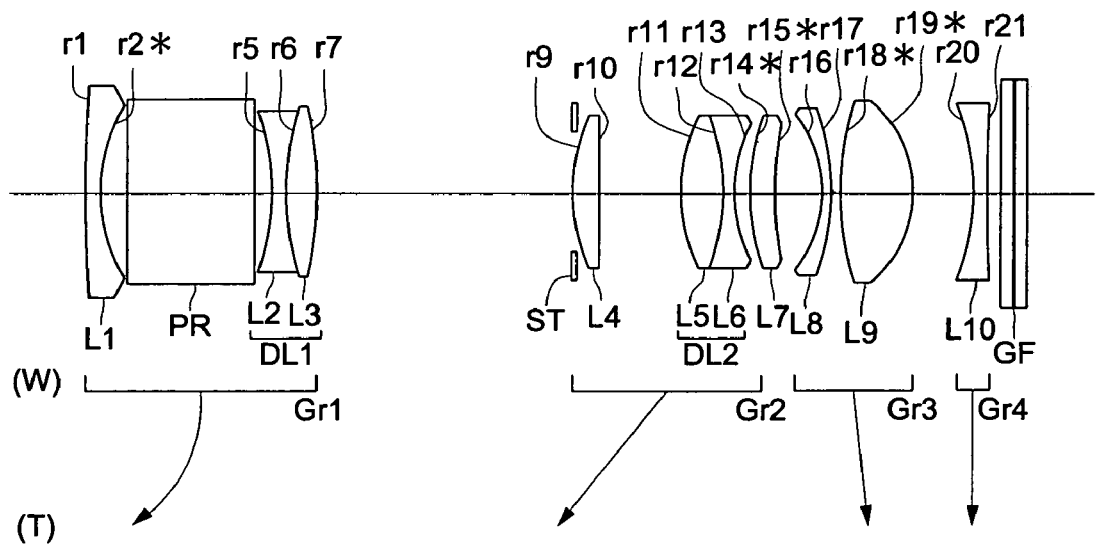
FIG. 2 illustrates the lens configuration drawing of the second embodiment of the present invention (a numeral embodiment 2).

The variable power optical system of the second embodiment illustrated in FIG. 2 comprises the first lens group Gr1 having negative refractive power, the second lens group Gr2 having positive refractive power, the third lens group having positive refractive power and the fourth lens group having negative refractive power, which are configured as-described below. Disposed in the following order from the subject side to the image side are the first lens group Gr1 including the first lens element L1 configured by a negative meniscus lens having a convex surface facing toward the subject side, a parallel flat plate corresponding to a prism as a reflective optical element PR, and the first cemented lens element configured by the second lens element L2 having concave surfaces in both sides and the third lens element L3 having convex surfaces in both sides, the second lens group Gr2 configured by a diaphragm ST, the fourth lens element L4 having convex surface facing toward the subject side, the second cemented lens DL2 including the fifth lens element having convex surfaces in both sides L5 positioned next to the fourth lens element L4, the sixth lens element L6 having concave surfaces in both sides and the seventh lens element L7 having positive meniscus shape having a convex surface facing toward the subject side, the third lens group Gr3 configured by the eighth lens having a negative meniscus shape and a concave surface facing toward the subject side and the ninth lens element L9 having convex surfaces in both sides and the fourth lens group Gr4 configured by the tenth lens element having concave surfaces in both sides. Further, a parallel flat plate GF corresponding to an optical low pass filter and an IR cut filter is disposed at the image side of the fourth lens group Gr4.

The first lens group Gr1 moves toward the subject side as increasing the increment amount of the moving amount of the first lens group Gr1; the second lens group Gr2 almost monotonously moves toward the subject side together with the diaphragm ST disposed at the most subject side of the second lens group Gr2; and the third lens group Gr3 almost monotonously moves toward the image side when changing the variable power from the most shortest focal length status (W) to the most longest focal length status (T) while the fourth lens group Gr4 and the parallel flat plate GF are fixed against the image pickup surface.

Among the lens surfaces, the image side surface of the first lens element L1, the both sides of the seventh lens element L7 and the both sides of the ninth lens element L9 respectively have aspherical surfaces.

Figure 3:
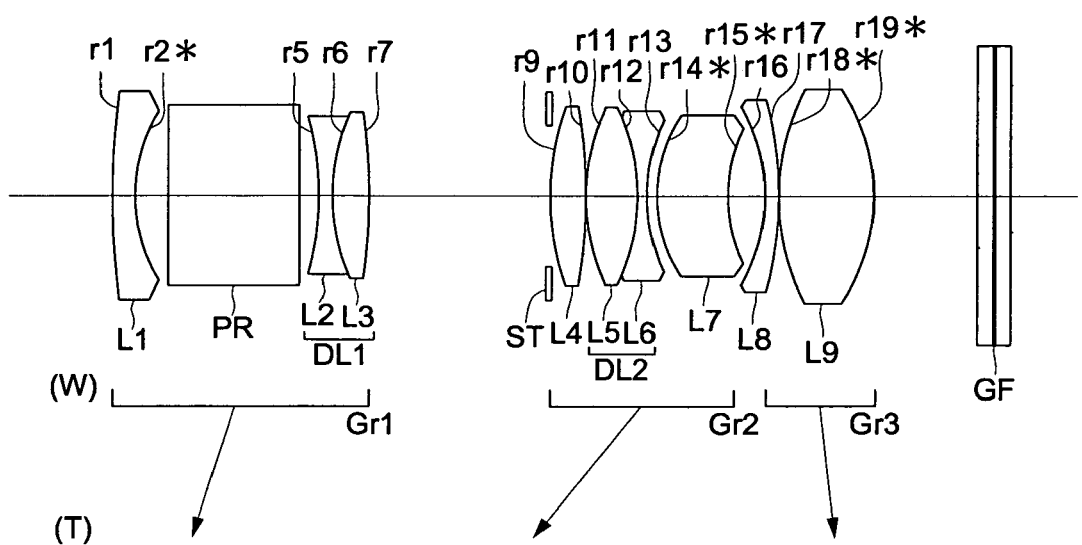
FIG. 3 illustrates the lens configuration drawing of the third embodiment of the present invention (a numeral embodiment 3).

The variable power optical system of the third embodiment illustrated in FIG. 3 comprises the first lens group Gr1 having negative refraction power, the second lens group Gr2 having positive refraction power and the third lens group Gr3 having positive refraction power, which are configured as described below. Disposed in the following order from the subject side to the image side are the first lens group Gr1 including the first lens element L1 configured by a negative meniscus lens having a convex surface facing toward the subject side, a parallel flat plate corresponding to a prism as a reflective optical element PR, and the first cemented lens element configured by the second lens element L2 having concave surfaces in both sides and the third lens element L3 having convex surfaces in both sides, the second lens group Gr2 configured by a diaphragm ST, the second cemented lens element DL2 including the fourth lens element L4 having convex shape surfaces in both sides, the fifth lens element L5 having convex shape surfaces in both sides and sixth lens element L6 having concave shaped surfaces in both sides, which are contacted each other, and the third lens group Gr3 configured by the eight lens element L8 having a negative meniscus shape including the concave surface facing toward the subject side and the ninth lens element L9 having convex shape surfaces in both sides. Further, a parallel flat plate GF corresponding to an optical low pass filter and an IR cut filter is disposed at the image side of the third lens group Gr3.

The first lens group Gr1 almost monotonously moves toward the subject side; the second lens group Gr2 almost monotonously moves toward the subject side together with the diaphragm ST disposed at the most subject side of the second lens group Gr2; and the third lens group Gr3 monotonously moves toward the image side when changing the variable power from the most shortest focal length status (W) to the most longest focal length status (T) while the parallel flat plate GF is fixed against the image pickup surface.

Among the lens element surfaces, the image side surfaces of the first lens element L1, both sides of the seventh lens element L7 and the both sides of the ninth lens element L9 respectively have aspherical surfaces.

Figure 4:
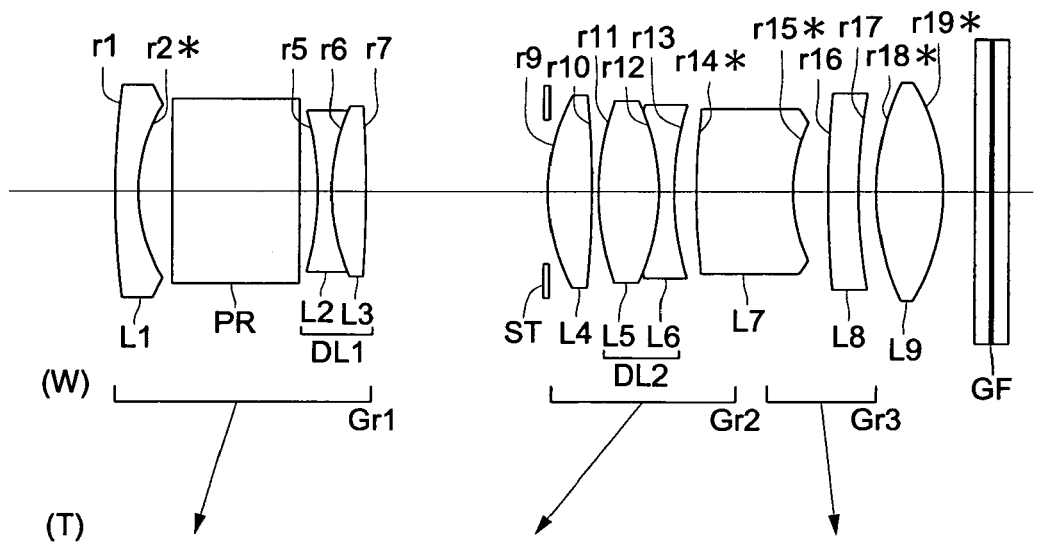
FIG. 4 illustrates the lens configuration drawing of the fourth embodiment of the present invention (a numeral embodiment 4).

The variable power optical system of the fourth embodiment illustrated in FIG. 4 comprises the first lens group Gr1 having negative refraction power, the second lens group Gr2 having positive refraction power and the third lens group Gr3 having positive refraction power, which are configured as described below. Disposed in the following order from the subject side to the image side are the first lens group Gr1 including the first lens element L1 configured by a negative meniscus lens having a convex surface facing toward the subject side, a parallel flat plate corresponding to a prism as a reflective optical element PR, and the first cemented lens element configured by the second lens element L2 having concave surfaces in both sides and the third lens element L3 having convex surfaces in both sides, the second lens group Gr2 configured by a diaphragm ST, the second cemented lens element DL2 including the fourth lens element L4 having convex shape surfaces in both sides, the fifth lens element L5 having convex shape surfaces in both sides and sixth lens element L6 having concave shaped surfaces in both sides, which are contacted each other, the seventh lens element L7 having a negative meniscus shape having convex surface facing toward the subject side and the third lens group Gr3 configured by the eight lens element L8 having a negative meniscus shape including the convex surface facing toward the subject side and the ninth lens element L9 having convex shape surfaces in both sides. Further, a parallel flat plate GF corresponding to an optical low pass filter and an IR cut filter is disposed at the image side of the third lens group Gr3.

The first lens group Gr1 monotonously moves toward the subject side; and the second lens group Gr2 monotonously moves toward the subject side together with the diaphragm ST disposed at the most subject side of the second lens group Gr2 when changing the variable power from the most shortest focal length status (W) to the most longest focal length status (T) while the third lens group Gr3 and the parallel flat plate GF is fixed against the image pickup surface.

Among the lens element surfaces, the image side surfaces of the first lens element L1, both sides of the seventh lens element L7 and the both sides of the ninth lens element L9 respectively have aspherical surfaces.

Figure 5:
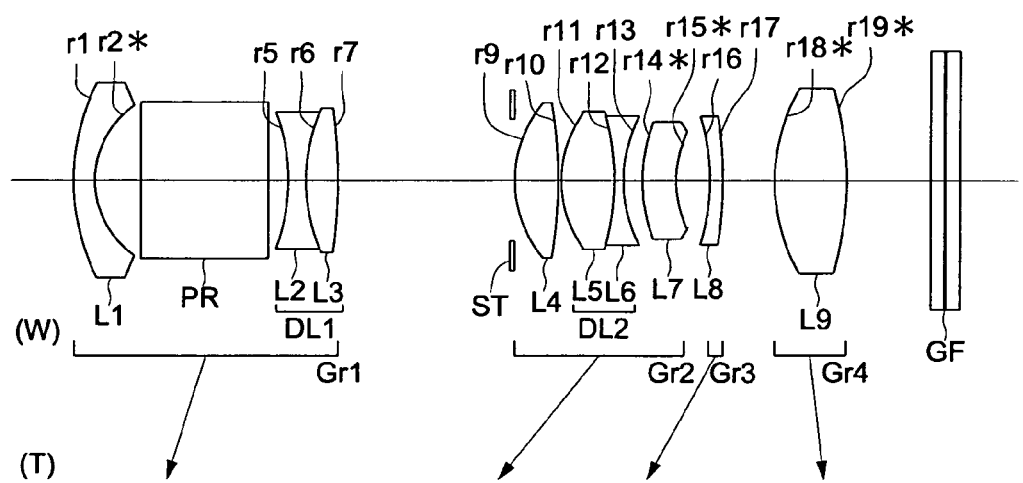
FIG. 5 illustrates the lens configuration drawing of the fifth embodiment of the present invention (a numeral embodiment 5).
Figure 6A:
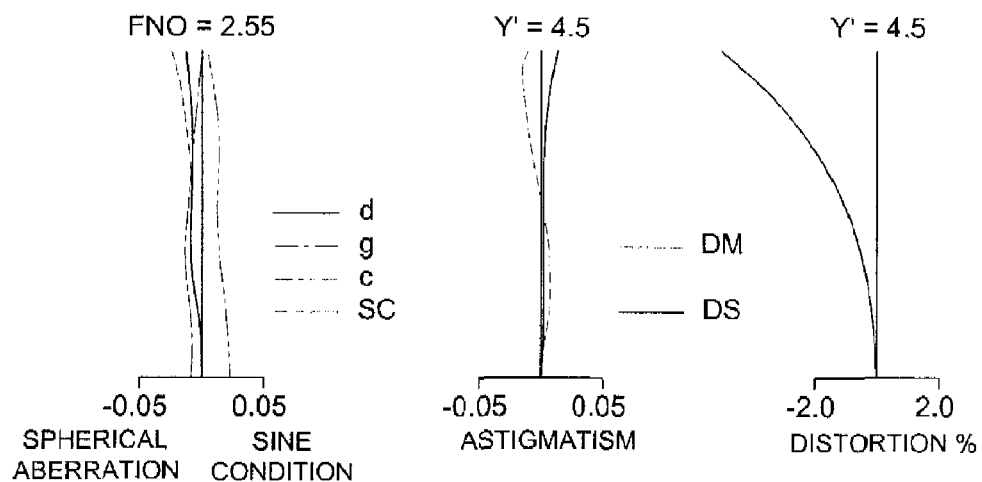
FIGS. 6(A)-6(C) illustrate an aberration drawing of the numeral embodiment 1 in an infinite focus state.
Figure 6B:
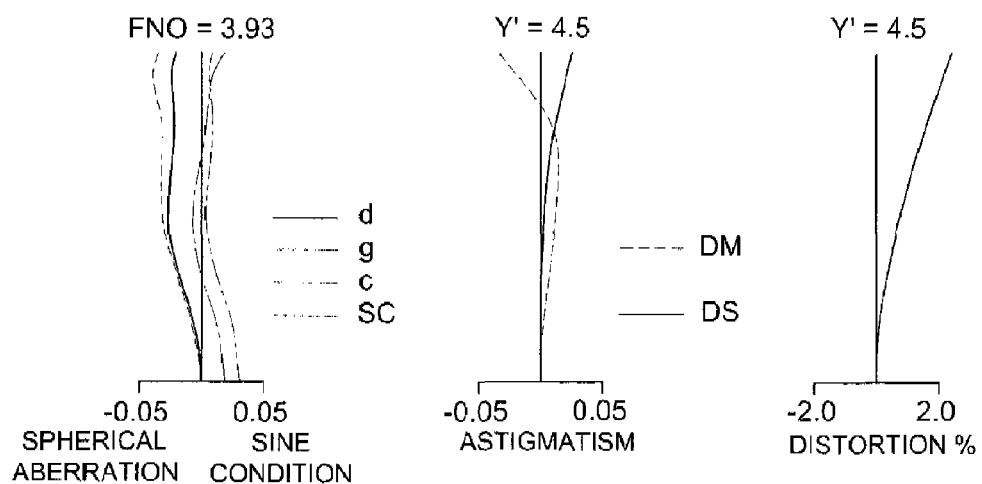
Figure 6C:
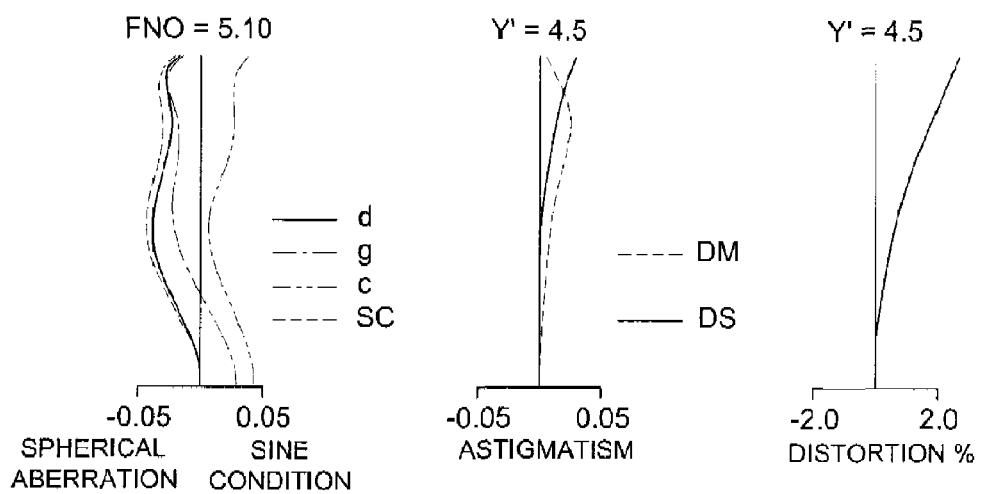
Figure 7:
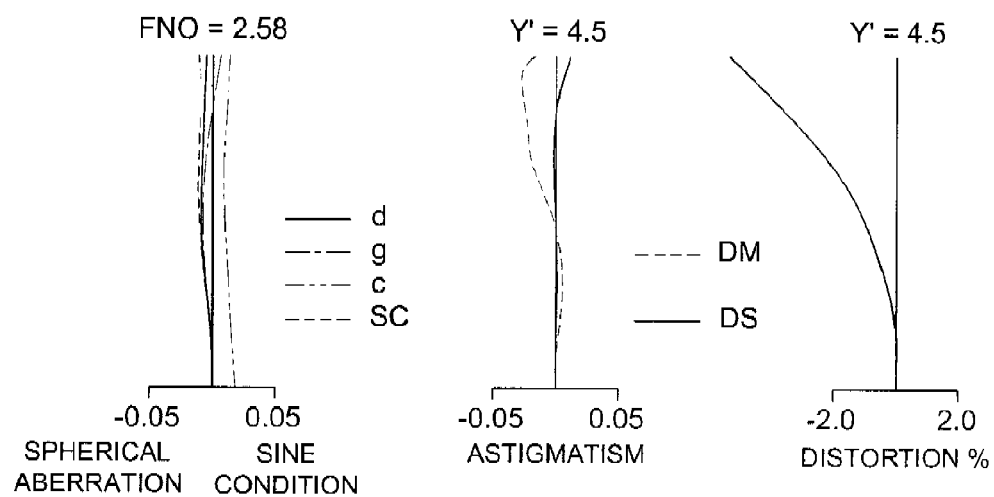
FIGS. 7(A)-7(C) illustrate an aberration drawing of the numeral embodiment 2 in an infinite focus state.
Figure 7:
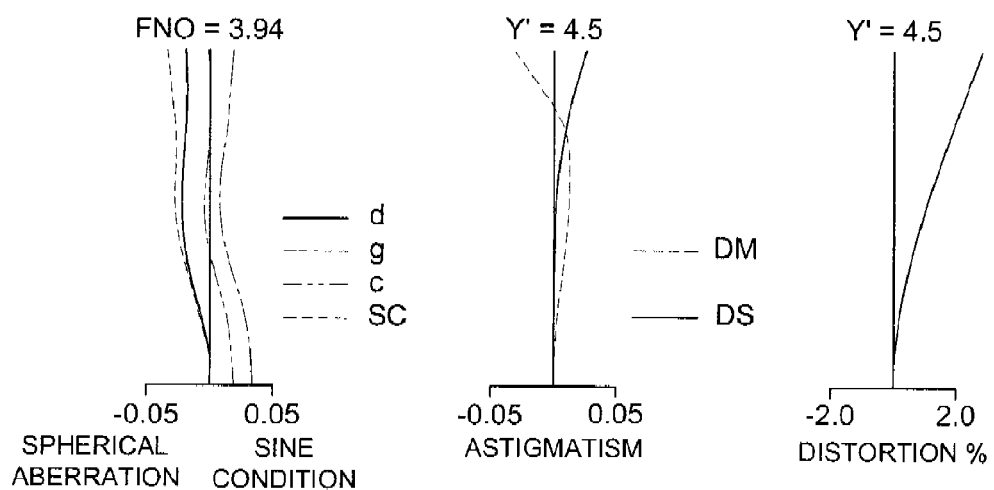
Figure 7:
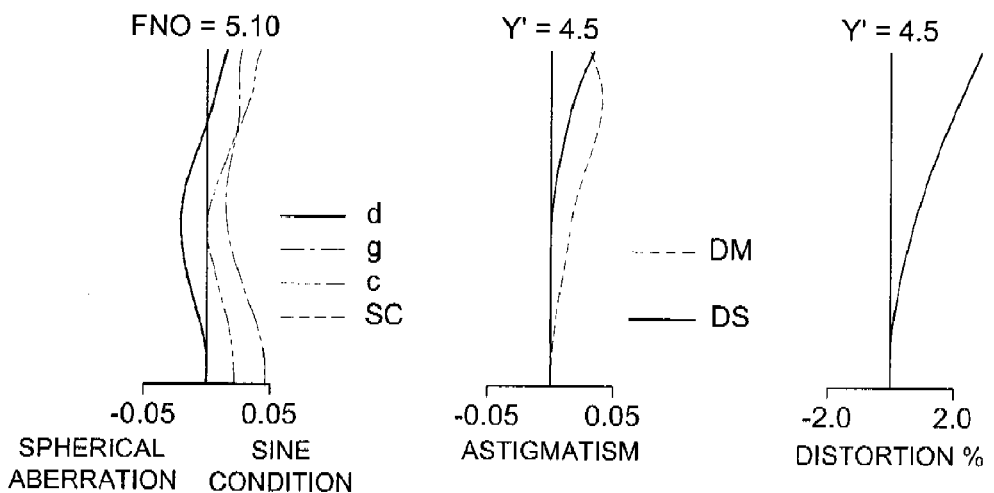
Figure 8A:
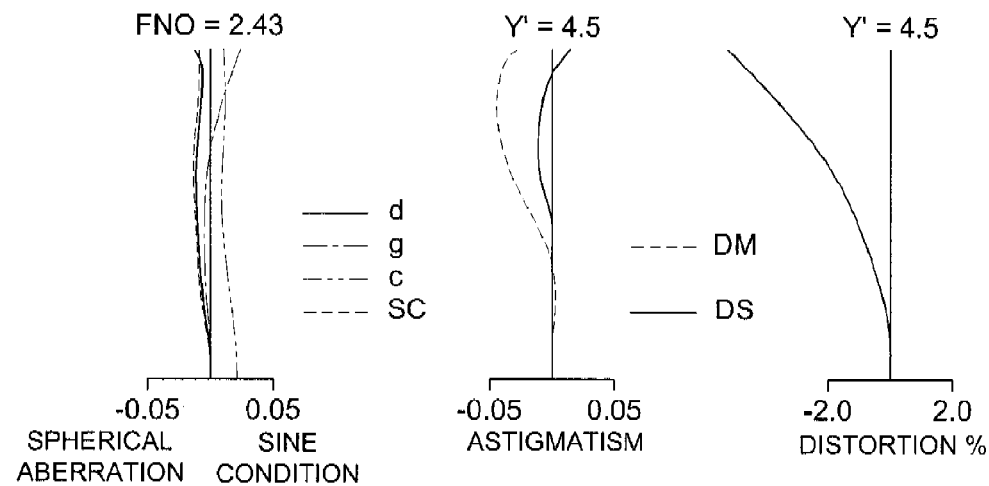
FIGS. 8(A)-8(C) illustrate an aberration drawing of the numeral embodiment 3 in an infinite focus state.
Figure 8B:
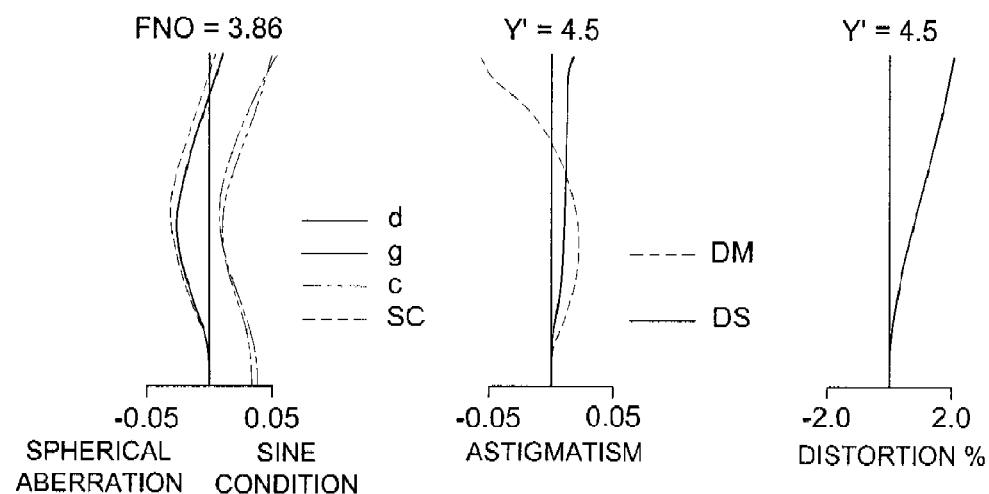
Figure 8C:
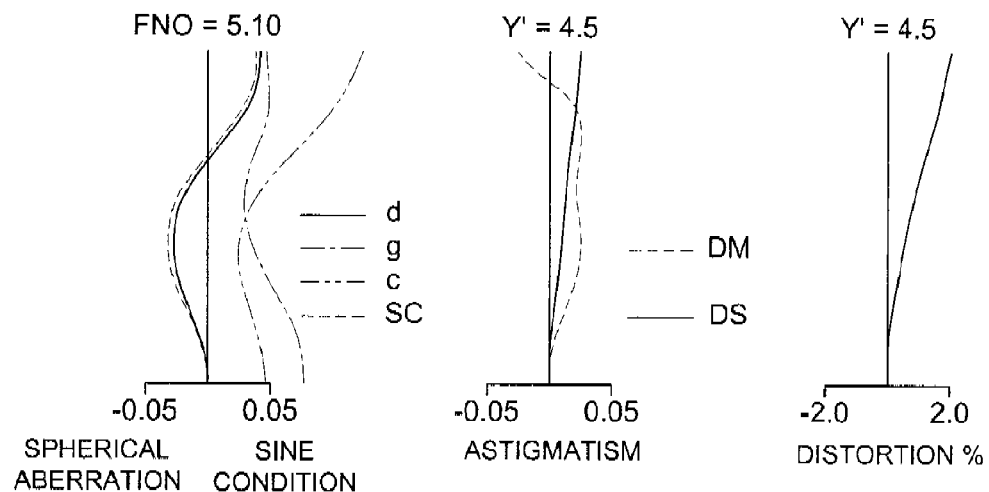
Figure 9A:
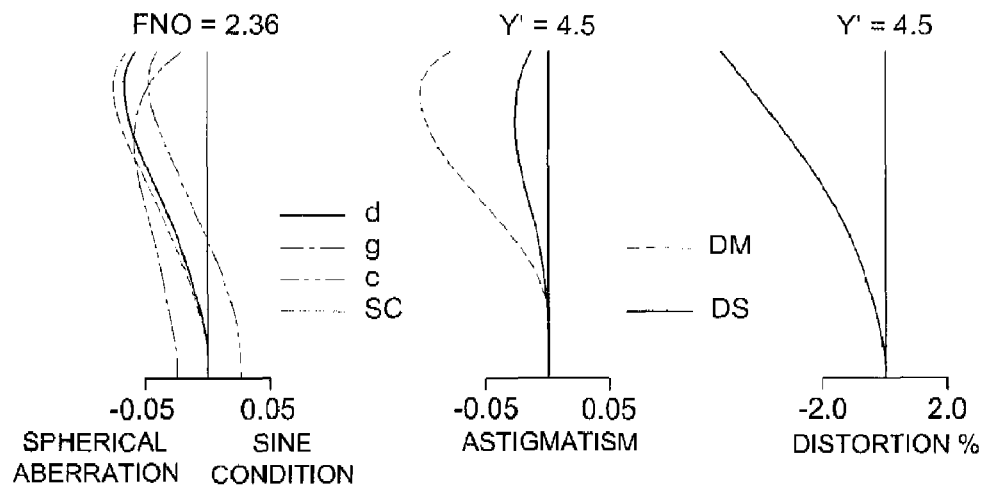
FIGS. 9(A)-9(C) illustrate an aberration drawing of the numeral embodiment 4 in an infinite focus state.
Figure 9B:
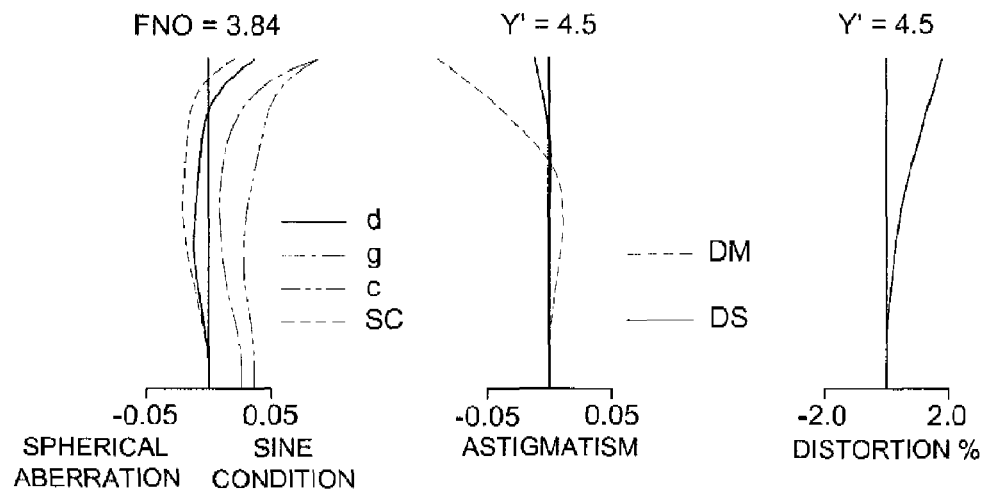
Figure 9C:
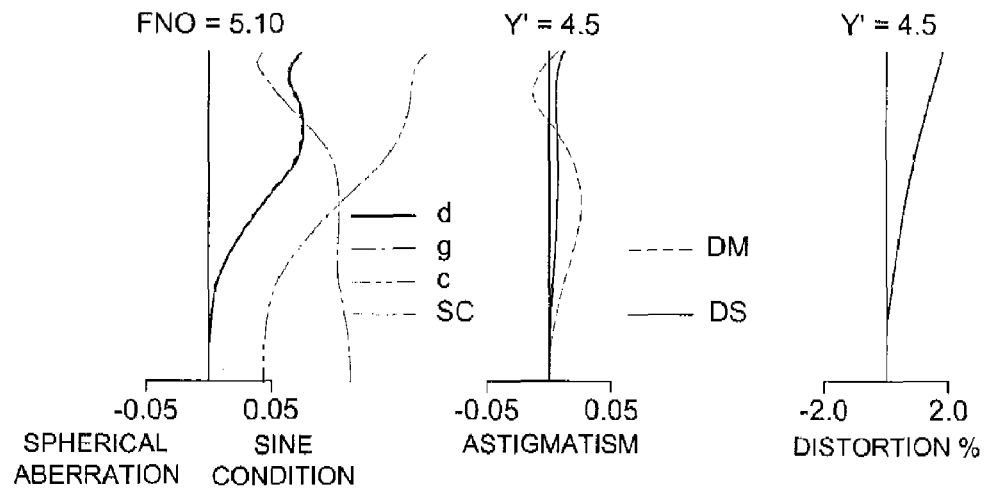
Figure 10:
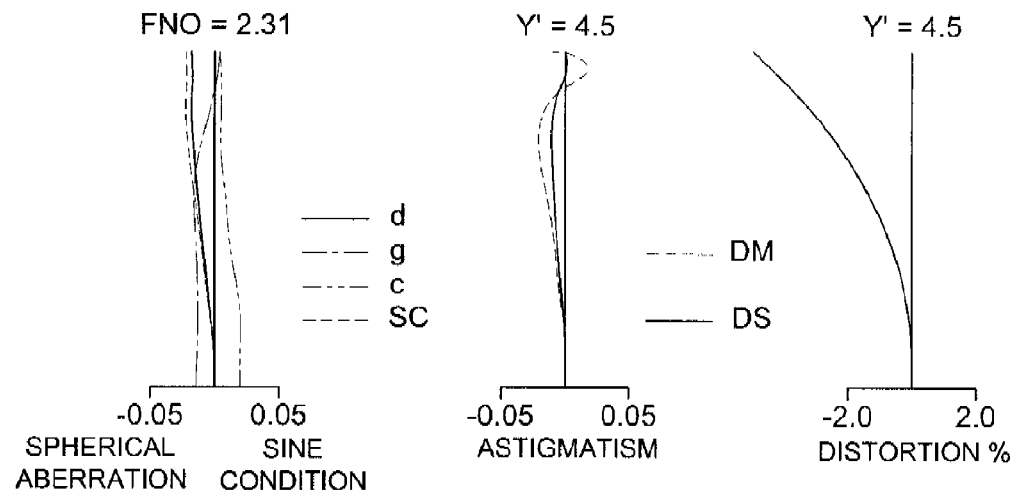
FIGS. 10(A)-10(C) illustrate an aberration drawing of the numeral embodiment 5 in an infinite focus state.
Figure 10:
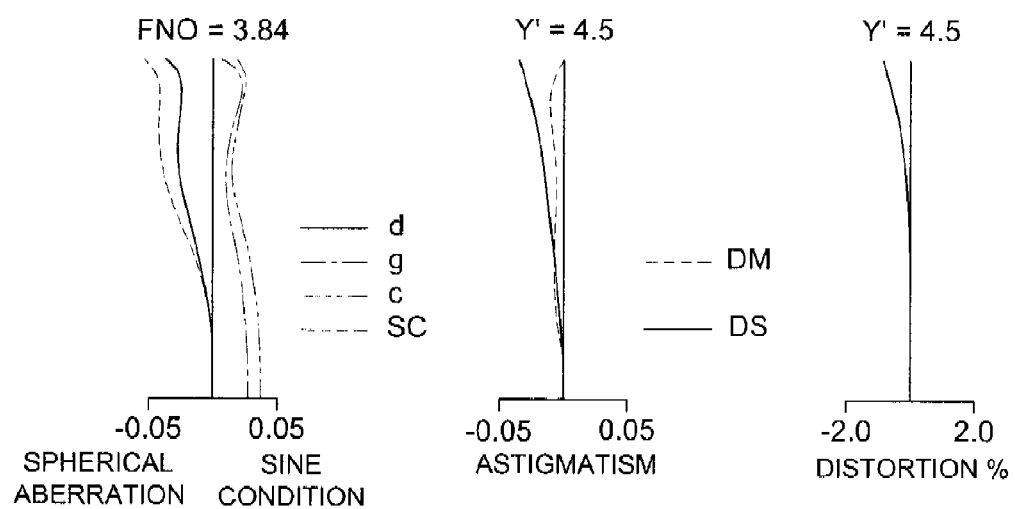
Figure 10:
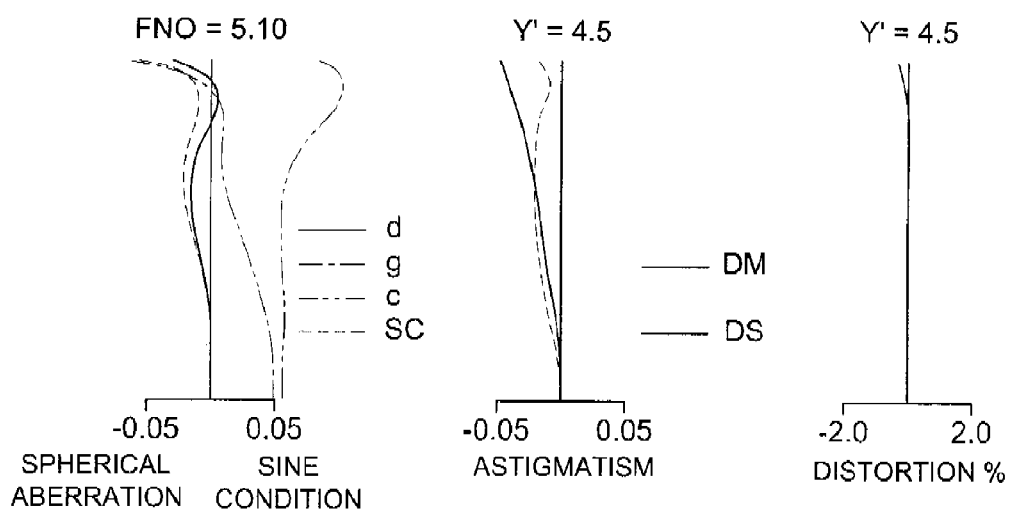

The variable power optical system of the fifth embodiment illustrated in FIG. 5 comprises the first lens group Gr1 having negative refractive power, the second lens group Gr2 having positive refractive power, the third lens group Gr3 having negative refractive power and the fourth lens group Gr4 having positive refractive power, which are configured as described below. Disposed in the following order from the subject side to the image side are the first lens group Gr1 including the first lens element L1 configured by a negative meniscus lens having a convex surface facing toward the subject side, a parallel flat plate corresponding to a prism as a reflective optical element PR, and the first cemented lens element configured by the second lens element L2 having concave surfaces in both sides and the third lens element L3 having convex surfaces in both sides, the second lens group Gr2 configured by a diaphragm ST, the second cemented lens element DL2 including the fourth lens element L4 having convex shaped surfaces in both sides, the fifth lens element L5 having convex shaped surfaces in both sides and the sixth lens element L6 having concave shaped surfaces in both side, each of which are contacted with each other, and the seventh lens element L7 having negative meniscus shape having a convex surface facing toward the subject side, the third lens group Gr3 configured by the eighth lens element L8 having negative meniscus shape having a concave surface facing toward the subject side and fourth lens group Gr4 configured by the ninth lens element having convex surfaces in both sides. Further, a parallel flat plate GF corresponding to an optical low pass filter and an IR cut filter is disposed at the image side of the fourth lens group Gr4.

This variable power optical system is arranged to monotonously move the first lens group Gr1 toward the subject side, to monotonously move the second lens group Gr2 together with a diaphragm ST disposed at the most subject side toward the subject side, to monotonously move the third lens group Gr3 toward the image side and to move the fourth lens group Gr4 toward the image side as decreasing the increment amount of the moving amount when changing the variable power from the most shortest focal length status (W) to the most longest focal length status (T) while the parallel flat plate GF is fixed against the image pickup surface.

In the variable power optical systems illustrated in FIGS. 1-5, the first lens group Gr1 has negative power. Consequently, each variable power optical system of each embodiment becomes an optical system having a negative lens group in the most subject side. As a result, it becomes easy to take a retro-focus type structure and to attain image side telecentric characteristic, which is necessary to form an image on an image pickup device.

Since the off-axis light beam passing through the first lens group Gr1 approaches to the optical axis, it becomes possible to make the lens diameter small. Consequently, for example, it becomes possible to minimize the size of a reflective surface RF of the prism being a reflective optical element PR at the reflective position.

In the first lens group Gr1, a negative meniscus lens L1 having a convex surface facing toward the subject side, a reflective optical element PR and the first cemented lens DL1 are disposed in this order from the subject side. This configuration will be described below.

Since due to the diverging effect of the lens L1 having negative refractive power, which is disposed in the most subject side, the entrance pupil position shifts toward the subject side, it becomes possible to make the thickness of the variable power optical system thin by shortening the light path length necessary to bend the light path. Further, by using a meniscus lens as the lens L1 having negative refraction power, the centers of curvature of both lens surfaces become close to the pupil. As a result, it becomes possible to suppress the occurrence of off-axis aberration.

The first cemented lens DL1 placed at the most image side in the first lens group has a role to mainly correct the aberration caused in the first lens group Gr1. It is preferable that the first cemented lens DL1 has negative refraction power from the-viewpoint of the power distribution and aberration correction of each optical element in the first lens group Grs1. Particularly, in order to effectively correct the color aberration, it is preferable that the cemented lens has negative refraction power.

This lens employs a cemented lens in each embodiment. However a single lens may configure it.

The optical axis in the subject side in the variable power optical system in each embodiment can be substantially bent by 90° by providing a reflective optical element PR having a reflection surface RF for bending the optical axis in the first lens group Gr1. As a result, it becomes possible to minimize the size of the variable power optical system in each embodiment in the photographic subject direction to the length, which is substantially equal to the length from the lens L1 placed at the most subject side to the reflection surface RF. Further, since the optical axis can be bent by the reflection surface RF, it becomes possible to make the variable power optical system of each embodiment thin in appearance.

With regard to the reflective optical element PR may be any one of (a) an internal reflective prism (each embodiment of the present invention), (b) a surface reflective prism, (c) an internal reflective flat panel mirror and (d) a surface reflective mirror. However, from the viewpoint of minimization of the optical system, (a) the internal reflective prism is preferable. When there is limitation in the total length of the lens, from the viewpoint of the aberration correction, it is preferable that air equivalent length measured from the first lens L1 to the third lens L3 is short as much as possible. Accordingly, it becomes possible to secure the real distance necessary for bending the optical axis with a short surface distance in an optical sense by using the internal reflective prism.

As described above, since the variable power optical system of each embodiment is a variable power optical system having a negative lens group in the most subject side, an adequate back-focus (an air equivalent length measured from the lens surface of the most image side to the image pickup surface) even in a situation where the focal length is set at a wide angle end position having the shortest focal length. However, since the second lens group Gr2 has positive power, it is necessary to shorten the total length of the variable power optical system at the telephoto end, even though the second lens group Gr2 is arranged to be set at a position, which is apart from the first lens group Gr1 as much as possible taking account the effect previously described. In order to realize this requirement, it is necessary to make the resultant power positive by closing the second lens group Gr2 having strong a convergence action to the first lens group at the telephoto end.

It becomes possible to attain a compact size variable power optical system to suppress the size of the first lens group Gr1 by providing the diaphragm ST at the most subject side of the second lens group Gr2.

Next, the condition which the variable power optical system of the embodiment described above preferably satisfies will be described below. It is preferable that at least a lens having negative power included in the first lens group Gr1 satisfies the following conditional formula (1).

$$Nd > 1.18 \quad (1)$$

Where Nd is a refractive index of a lens having a negative refractive power at d-line.

Since, when the refractive index is less than the lower limit of the conditional formula (1), in order to increase the refractive power of the lens having negative refractive power, it is necessary to increase the curvature of the lens having negative refractive power, the thickness of the image pickup optical system increases. As a result, the size of the variable power optical system becomes large.

Further, it is preferable that at least a lens having negative refractive power included in the first lens group Gr1 satisfies the following conditional formula.

$$vd < 32 \quad (2)$$

Where vd is Abbe number of the lens having a negative refractive power.

When the Abbe number exceeds the upper limit of the conditional formula (2), since the color aberration in the first lens group becomes a situation where the color aberration cannot be fully corrected. As a result, the lowering of the image quality caused by the color aberration occurs in the image formed by the variable power optical system.

Only one lens having negative refractive power is disposed in the subject side against the reflective optical element included in the first lens group Gr1. It is preferable that the lens having negative refractive power satisfies the following formula (3).

$$vd < 40 \quad (3)$$

Where vd is an Abbe number of the lens having a negative refraction power.

When the Abbe number exceeds the upper limit of the conditional formula (3), the color aberration in the first lens group gets in a situation where the color aberration cannot be fully corrected. As a result, the lowering of the image quality caused by the color aberration occurs in the image formed by the variable power optical system. The variable power optical system of each embodiment comprises the first lens group Gr1 having negative refraction power, the second lens group Gr2 having positive refraction power and at least a lens group next to the second lens group Gr2 in the order from the subject side. The first lens group Gr1 comprises a single lens having negative refractive power, a reflective optical element and at least a lens element, which satisfies the conditional formula (3).

It is preferable that the lens having negative refraction power in the first lens satisfies the following conditional formula (4).

$$0.47 < |\phi Ln/\phi W| < 1.50 \quad (4)$$

Where, Ln denotes the refraction power of the lens having a negative refraction power and FEW denotes the refraction power of the total optical system at the wide-angle end.

The conditional formula (4) is a formula for stipulating the refraction power of the lens having negative refraction power in the first lens group Gr1. Since when the negative refraction power is less than the lower limit of the conditional formula (4), the refraction power of the lens having negative refraction power becomes too weak, the extend of circumference light beams at the wide angle end become large and the size of the variable power optical system itself becomes large. Since when the refraction power exceeds the upper limit of the conditional formula (1), the refraction power of the lens having negative refraction power becomes to strong, it becomes impossible to correct the distortion at the wide angle end.

It is preferable that when the reflective optical element PR included in the first lens group Gr1 is an internal reflective prism, the reflective optical element PR satisfies the conditional formula (5).

$$0.50 < Dp/fw < 1.50 \quad (5)$$

Where fw denotes the length of the internal reflective prism in the optical axis direction and fw denotes a focal length at the wide-angle end.

The conditional formula (5) is a formula for defining the length in the optical axis direction of the internal reflective prism. When the value of Dp/fw is less than the lower limit of the conditional formula (5), the circumference light beams of the internal reflective prism eclipses and results in lowering the circumference luminance on the image pickup surface. When the value of Dp/fw exceeds the upper limit of the conditional formula (5), since the size of the internal reflective prism becomes large, the thickness and total length of the variable power optical system become large.

A refractive type lens, which is a lens for deflecting the light beams at the interface between the materials having different refractive indexes, for deflecting the incident light beams by refraction is used in the variable power optical system TL, which configures respective embodiments. However, the lens, which can be used, is not limited to this type of lens. For example, a diffraction type lens for deflecting the incident light beams by diffraction, a refraction-diffraction hybrid type lens for deflecting the incident light beams by combining diffraction and refraction and a refractive index distribution type lens for deflecting the incident light beams by the refractive index distribution in the material may be used. However, since due to the complicated manufacturing method, the cost of the refractive index distribution lens in which the refractive index changes becomes high, it is preferable that a lens configured by a uniform refractive index distribution material is used. In addition to the aperture diaphragm ST, a light beam regulation plate may be disposed if necessary.

According to the embodiment of the present invention, it becomes possible to provide a compact size variable power optical system having high image quality, which fully corresponds to the request of the compact size image pickup optical system.

Embodiments

The configurations of the variable power optical systems described as respective embodiments will be described below by using construction data and aberration drawings.

The numeral embodiments 1-5 described here correspond to the embodiments illustrated in FIGS. 1-5, which are lens configuration drawings of respective embodiments described above. Li (i=1, 2, 3, . . . ) denotes that the lens is disposed at a position in the order of "i" counted from the subject side. DL1 denotes the first cemented lens configured by the second lens L2 and the third lens L3 and DL2 denotes the second cemented lens configured by the fifth lens L5 and the sixth lens L6.

In respective numeral embodiments 1-5, ri (i=1, 2, 3, . . . ) denotes a curvature radius (mm) of the surface disposed at the position in the order of "i" counted from the subject side, di (i=1, 2, 3, . . . ) denotes a surface distance on the axis (mm) disposed at the position in the order of "i" counted from the subject side and Ni (i=1, 2, 3, . . . ) and vi (i=1, 2, 3, . . . ) denotes a refractive index and Abbe number at d line of the lens disposed at the position in the order of "i" counted from the subject side.

In the numeral embodiments 1-4, the surface distances on the axis d7, d15 and d19, which vary as the variable power is changed, denotes variable distances respectively at the most shortest focal length (a wide angel end: W), middle focal length (middle: M), and the longest focal length (a telephoto end: T). In the numeral embodiments 5, the surface distance on the axis d7, d15, d17 and d19, which vary as the variable power is changed, denotes the value of the variable distances respectively at the most shortest focal length (a wide angel end: W), middle focal length (middle: M), and the longest focal lengths (a telephoto end: T). The focal length (f: mm) and F number (FNO) of the total optical system corresponding to the respective focal lengths (W), (M) and (T) are shown in addition to the other data as the same way.

Further, in the numeral embodiments 1-5, the curvature radius having an * mark therewith denotes a surface of a refractive optical surface having an aspherical surface shape or a surface having an action equivalent to an aspherical surface. The surface shape of the aspherical surface is expressed by the following formula (AS).

$$Z(h) = r - (r^2 - \epsilon \times h^2)^{1/2} + \Sigma Ai \times Hi \quad (AS)$$

Where h denotes the height in the vertical direction from the optical axis; Z (h) denotes a displacement amount in the optical axis direction at a height h (referencing on the top of the surface); r denotes a near axis curvature radius; E denotes an eclipse coefficient; Ai denotes an i-order aspheric surface coefficient; and hi denotes the h to the i-th power.

The aspherical surface data of the numeral embodiments 1-5 will be described together with other data. The character "D", which is added to the data in the numeral embodiments 1-5 denotes the exponential portion of the number, for example, 1.0 D-02 denotes that $1.0 \times 10^{-2}$.

Numeral Embodiment 1

TABLE 1 f 7.90-15.80-22.52 (mm)
FNO 2.55-3.94-5.10

| Curvature Radius (mm) | | Distance on Optical Axis (mm) | | Refraction Index: Nd | | Abbe number: vd | |
|---|---|---|---|---|---|---|---|
| r1 | 222.419 | d1 | 0.80 | N1 | 1.84410 | v1 | 26.38 |
| r2* | 11.686 | d2 | 2.13 | | | | |
| r3 | ∞ | d3 | 9.40 | N2 | 1.84666 | v2 | 23.82 |
| r4 | ∞ | d4 | 1.18 | | | | |
| r5 | −23.524 | d5 | 0.80 | N3 | 1.71871 | v3 | 52.86 |
| r6 | 17.513 | d6 | 2.51 | N4 | 1.84493 | v4 | 23.84 |
| r7 | −43.714 | d7 | 15.01-5.82-3.00 | | | | |
| r8 | ∞ | d8 | 0.00 | | | | |
| r9 | 14.439 | d9 | 1.88 | N5 | 1.79954 | v5 | 46.19 |
| r10 | 191.986 | d10 | 2.25 | | | | |
| r11 | 11.840 | d11 | 2.82 | N6 | 1.64711 | v6 | 56.13 |
| r12 | −31.162 | d12 | 0.60 | N7 | 1.83066 | v7 | 25.59 |
| r13 | 11.516 | d13 | 1.28 | | | | |
| r14* | 18.931 | d14 | 1.19 | N8 | 1.4874a9 | v8 | 70.44 |
| r15* | 70.768 | d15 | 7.10-20.43-29.82 | | | | |
| r16 | −10.166 | d16 | 0.80 | N9 | 1.53262 | v9 | 49.04 |
| r17 | −29.054 | d17 | 0.10 | | | | |
| r18* | 19.299 | d18 | 5.20 | N10 | 1.48749 | v10 | 70.44 |
| r19* | −7.458 | d19 | 4.50-3.03-2.00 | | | | |
| r20 | −19.724 | d20 | 0.70 | N11 | 1.74985 | v11 | a51.73 |
| r21 | 106.511 | d21 | 1.11 | | | | |
| r22 | ∞ | d22 | 0.80 | N12 | 1.54426 | v12 | 69.60 |
| r23 | ∞ | d23 | 0.10 | | | | |
| r24 | ∞ | d24 | 0.80 | N13 | 1.51680 | v13 | 64.20 |
| r25 | ∞ | d25 | 0.40 | | | | |

TABLE 1-continued f 7.90-15.80-22.52 (mm)
FNO 2.55-3.94-5.10

|  | 2-nd Surface | 14th Surface | 15th Surface | 18th Surface | 19th Surface |
|---|---|---|---|---|---|
| ε | 1.00000 | 1.00000 | 1.00000 | 1.00000 | 1.00000 |
| A4 | −3.74353D−05 | 3.93036D−05 | 2.89153D−04 | −1.41236D−04 | 5.66238D−04 |
| A6 | −1.07871D−06 | −7.55560D−06 | −4.72436D−06 | 3.66797D−06 | 9.54502D−07 |
| A8 | 4.50620D−08 | 7.73660D−07 | 7.74775D−07 | −1.47122D−07 | 3.77649D−08 |
| A10 | −9.05080D−10 | −2.09316D−08 | −2.14711D−08 | 2.58490D−09 | −1.90460D−09 |
| A12 | 6.94673D−12 | — | — | −3.38436D−12 | 6.79301D−11 |

Numeral Embodiment 2

TABLE 2 f 7.90-15.80-22.52 (mm)
FNO 2.58-3.94-5.10

|  | Curvature Radius (mm) |  | Distance on Optical Axis (mm) |  | Refraction Index: Nd |  | Abbe number: νd |
|---|---|---|---|---|---|---|---|
| r1 | 186.435 | d1 | 0.80 | N1 | 1.9999 | ν1 | 16.00 |
| r2* | 12.913 | d2 | 1.94 |  |  |  |  |
| r3 | ∞ | d3 | 9.40 | N2 | 1.84666 | ν2 | 23.82 |
| r4 | ∞ | d4 | 1.25 |  |  |  |  |
| r5 | −20.963 | d5 | 0.93 | N3 | 1.66139 | ν3 | 62.3 |
| r6 | 29.596 | d6 | 2.34 | N4 | 1.89308 | ν4 | 17.85 |
| r7 | −34.295 | d7 | 17.16-6.27-3.00 |  |  |  |  |
| r8 | ∞ | d8 | 0.00 |  |  |  |  |
| r9 | 14.909 | d9 | 1.79 | N5 | 1.81073 | ν5 | 49.33 |
| r10 | 87.792 | d10 | 6.26 |  |  |  |  |
| r11 | 11.014 | d11 | 3.13 | N6 | 1.64842 | ν6 | 62.7 |
| n12 | −18.228 | d12 | 0.61 | N7 | 1.83549 | ν7 | 26.89 |
| r13 | 11.327 | d13 | 0.93 |  |  |  |  |
| r14* | 10.594 | d14 | 1.91 | N8 | 1.48849 | ν8 | 70.37 |
| r15* | 18.480 | d15 | 3.69-16.51-25.45 |  |  |  |  |
| r16 | −9.335 | d16 | 0.80 | N9 | 1.56355 | ν9 | 37.15 |
| r17 | −15.722 | d17 | 0.75 |  |  |  |  |
| r18* | 29.406 | d18 | 5.11 | N10 | 1.49252 | ν10 | 70.08 |
| r19* | −7.793 | d19 | 4.60-3.11-2.00 |  |  |  |  |
| r20 | −19.150 | d20 | 0.70 | N11 | 1.62840 | ν11 | 33.15 |
| r21 | 71.178 | d21 | 1.17 |  |  |  |  |
| r22 | ∞ | d22 | 0.80 | N12 | 1.54426 | ν12 | 69.60 |
| r23 | ∞ | d23 | 0.10 |  |  |  |  |
| r24 | ∞ | d24 | 0.80 | N13 | 1.51680 | ν13 | 64.20 |
| r25 | ∞ | d25 | 0.40 |  |  |  |  |

|  | 2-nd Surface | 14th Surface | 15th Surface | 18th Surface | 19th Surface |
|---|---|---|---|---|---|
| ε | 1.00000 | 1.00000 | 1.00000 | 1.00000 | 1.00000 |
| A4 | −3.21280D−05 | −1.53029D−05 | 2.91746D−04 | −1.43384D−04 | 4.42934D−04 |
| A6 | −6.94840D−07 | −1.09375D−05 | −1.08996D−05 | 9.52699D−07 | −5.66466D−07 |
| A8 | 3.48625D−08 | 5.27414D−07 | 6.10001D−07 | −6.61380D−08 | 5.02672D−08 |
| A10 | −8.62540D−10 | −1.52482D−08 | −1.84750D−08 | 4.13607D−09 | −1.80167D−09 |
| A12 | 8.31365D−12 | — | — | 6.13064D−12 | 4.00870DD−11 |

Numeral Embodiment 3

TABLE 3 f 7.20-14.37-20.42 (mm)
FNO 2.43-3.68-5.10

|  | Curvature Radius (mm) |  | Distance on Optical Axis (mm) |  | Refraction Index: Nd |  | Abbe number: νd |
|---|---|---|---|---|---|---|---|
| r1 | 35.764 | d1 | 1.68 | N1 | 1.810000 | ν1 | 37.60 |
| r2* | 7.513 | d2 | 1.98 |  |  |  |  |
| r3 | ∞ | d3 | 7.50 | N2 | 1.84666 | ν2 | 23.82 |
| r4 | ∞ | d4 | 1.01 |  |  |  |  |
| r5 | −18.139 | d5 | 0.82 | N3 | 1.64806 | ν3 | 56.07 |

TABLE 3-continued f 7.20-14.37-20.42 (mm)
FNO 2.43-3.68-5.10

| | | | | | | | | |
|---|---|---|---|---|---|---|---|---|
| r6 | 13.692 | d6 | 2.17 | N4 | 1.84115 | v4 | 30.12 |
| r7 | −453195 | d7 | 12.11-5.02-3.00 | | | | |
| r8 | ∞ | d8 | 0.00 | | | | |
| r9 | 11.987 | d9 | 2.69 | N5 | 1.7544 | v5 | 51.57 |
| r10 | −47.899 | d10 | 0.2 | | | | |
| r11 | 173931 | d11 | 2.64 | N6 | 1.67076 | v6 | 54.92 |
| r12 | −12.050 | d12 | 0.60 | N7 | 1.81605 | v7 | 30.02 |
| r13 | 11.269 | d13 | 0.65 | | | | |
| r14* | 7.936 | d14 | 4.16 | N8 | 1.65008 | v8 | 55.95 |
| r15* | 7.841 | d15 | 2.01-14.29-23.47 | | | | |
| r16 | −11.510 | d16 | 0.80 | N9 | 1.59194 | v9 | 50.99 |
| r17 | −53.636 | d17 | 0.10 | | | | |
| r18* | 15.124 | d18 | 5.82 | N10 | 1.48749 | v10 | 70.44 |
| r19* | −8.627 | d19 | 6.02-5.04-3.98 | | | | |
| r20 | ∞ | d20 | 0.80 | N11 | 1.54426 | v11 | 69.60 |
| r21 | ∞ | d21 | 1.10 | | | | |
| r22 | ∞ | d22 | 0.80 | N12 | 1.51680 | v12 | 64.20 |
| r23 | ∞ | d23 | 0.40 | | | | |

| | 2-nd Surface | 14th Surface | 15th Surface | 18th Surface | 19th Surface |
|---|---|---|---|---|---|
| ε | 1.00000 | 1.00000 | 1.00000 | 1.00000 | 1.00000 |
| A4 | −8.06685D−05 | −8.14598D−05 | 5.49679D−04 | −7.20555D−05 | 5.07326D−04 |
| A6 | −5.01107D−06 | −7.05138D−06 | 8.58166D−07 | 6.52147D−06 | −1.46702D−06 |
| A8 | 4.24231D−07 | 1.16983D−07 | 1.47239D−08 | −1.95603D−07 | 2.65675D−07 |
| A10 | −2.01510D−08 | −7.55113D−09 | −1.90771D−08 | 5.25190D−09 | −8.66642D−09 |
| A12 | 3.32047D−10 | — | — | −3.06511D−11 | 1.53071D−10 |

Numeral Embodiment 4

TABLE 4 f 7.00-13.990-19.92 (mm)
FNO 2.36-3.84-5.10

| | Curvature Radius (mm) | | Distance on Optical Axis (mm) | | Refraction Index: Nd | | Abbe number: vd |
|---|---|---|---|---|---|---|---|
| r1 | 39.882 | d1 | 1.08 | N1 | 1.81408 | v1 | 37.08 |
| r2* | 6.660 | d2 | 2.29 | | | | |
| r3 | ∞ | d3 | 7.50 | N2 | 1.84666 | v2 | 23.82 |
| r4 | ∞ | d4 | 0.92 | | | | |
| r5 | −26.310 | d5 | 0.80 | N3 | 1.59274 | v3 | 46.35 |
| r6 | 11.570 | d6 | 2.19 | N4 | 1.84666 | v4 | 23.82 |
| r7 | −461.734 | d7 | 10.63-4.75-3.00 | | | | |
| r8 | ∞ | d8 | 0.00 | | | | |
| r9 | 9.674 | d9 | 2.69 | N5 | 1.75954 | v5 | 50.87 |
| r10 | −602.718 | d10 | 0.33 | | | | |
| r11 | 14.426 | d11 | 3.65 | N6 | 1.64117 | v6 | 56.45 |
| r12 | −11.458 | d12 | 0.94 | N7 | 1.84574 | v7 | 24.68 |
| r13 | 15.601 | d13 | 1.26 | | | | |
| r14* | 16.158 | d14 | 5.61 | N8 | 1.83453 | v8 | 37.84 |
| r15* | 9.895 | d15 | 2.00-12.44-21.06 | | | | |
| r16 | 196.198 | d16 | 1.77 | N9 | 1.82789 | v9 | 43.58 |
| r17 | 24.820 | d17 | 1.06 | | | | |
| r18* | 12.492 | d18 | 3.81 | N10 | 1.55945 | v10 | 42.38 |
| r19* | −10.830 | d19 | 2.11 | | | | |
| r20 | ∞ | d20 | 0.80 | N11 | 1.54426 | v11 | 69.60 |
| r21 | ∞ | d21 | 0.10 | | | | |
| r22 | ∞ | d22 | 0.80 | N12 | 1.51680 | v12 | 64.20 |
| r23 | ∞ | d23 | 0.60 | | | | |

| | 2-nd Surface | 14th Surface | 15th Surface | 18th Surface | 19th Surface |
|---|---|---|---|---|---|
| ε | 1.00000 | 1.00000 | 1.00000 | 1.00000 | 1.00000 |
| A4 | −1.32609D−05 | −5.98600D−04 | −2.16532D−05 | −1.42379D−04 | 2.87283D−04 |
| A6 | −5.70133D−06 | −1.64575D−05 | −1.13681D−05 | −1.44823D−06 | −3.92898D−06 |
| A8 | 1.14099D−07 | 9.49857D−08 | 3.99267D−07 | 1.65985D−07 | 2.21151D−07 |
| A10 | −2.21012D−09 | −1.17951D−08 | −5.72858D−09 | −3.03721D−09 | −3.74232D−09 |
| A12 | −8.12920D−11 | — | — | −4.58832D−12 | −1.28495D−12 |

Numeral Embodiment 5

TABLE 5 f 7.18-14.36-20.46 (mm)
FNO 2.31-3.84-5.10

| | Curvature Radius (mm) | | Distance on Optical Axis (mm) | | Refraction Index: Nd | | Abbe number: vd |
|---|---|---|---|---|---|---|---|
| r1 | 18.073 | d1 | 1.16 | N1 | 1.81274 | ν1 | 32.95 |
| r2* | 6.096 | d2 | 2.77 | | | | |
| r3 | ∞ | d3 | 7.59 | N2 | 1.84666 | ν2 | 23.82 |
| r4 | ∞ | d4 | 1.34 | | | | |
| r5 | −12.120 | d5 | 0.80 | N3 | 1.48880 | ν3 | 69.48 |
| r6 | 18.529 | d6 | 1.98 | N4 | 1.84666 | ν4 | 69.48 |
| r7 | −63.532 | d7 | 10.07-4.78-3.00 | | | | |
| r8 | ∞ | d8 | 0.00 | | | | |
| r9 | 9.397 | d9 | 2.60 | N5 | 1.59730 | ν5 | 59.19 |
| r10 | −65.001 | d10 | 0.21 | | | | |
| r11 | 8.758 | d11 | 3.16 | N6 | 1.48749 | ν6 | 70.44 |
| r12 | −20.995 | d12 | 0.60 | N7 | 1.76491 | ν7 | 25.43 |
| r13 | 11.562 | d13 | 1.17 | | | | |
| r14* | 13.421 | d14 | 1.80 | N8 | 1.78118 | ν8 | 46.81 |
| r15* | 12.995 | d15 | 2.00-7.29-9.07 | | | | |
| r16 | −13.504 | d16 | 0.80 | N9 | 1.48921 | ν9 | 69.19 |
| r17 | −30.734 | d17 | 3.08-11.60-19.08 | | | | |
| r18* | 12.955 | d18 | 4.13 | N10 | 1.48749 | ν10 | 70.44 |
| r19* | −23.600 | d19 | 4.88-2.85-2.02 | | | | |
| r20 | ∞ | d20 | 0.80 | N11 | 1.54426 | ν11 | 69.60 |
| r21 | ∞ | d21 | 0.10 | | | | |
| r22 | ∞ | d22 | 0.80 | N12 | 1.51680 | ν12 | 64.20 |
| r23 | ∞ | d23 | 0.41 | | | | |

| | 2-nd Surface | 14th Surface | 15th Surface | 18th Surface | 19th Surface |
|---|---|---|---|---|---|
| ε | 1.00000 | 1.00000 | 1.00000 | 1.00000 | 1.00000 |
| A4 | −2.21681D−04 | −8.03709D−05 | 6.98209D−04 | 8.26034D−05 | 2.05842D−04 |
| A6 | −3.47404D−06 | −1.04049D−05 | −1.06359D−06 | −1.08695D−06 | −4.93024D−07 |
| A8 | −2.91850D−07 | −3.83772D−07 | −1.73078D−07 | 1.05066D−07 | −1.80458D−08 |
| A10 | 1.19331D−08 | — | — | −3.18529D−09 | −8.48490D−11 |
| A12 | −3.91601D−10 | — | — | 4.46020D−11 | 2.19637D−11 |

FIGS. 6(A)-10(C) denote aberration drawings corresponding to the embodiments 1-5. FIGS. 6(A), 7(A), 8(A), 9(A) and 10(A) denotes a spherical aberration drawing, an astigmatism drawing and a distortion aberration drawing in the shortest focal length situation; FIGS. 6(B), 7(B), 8(B), 9(B) and 10(B) denotes a spherical aberration drawing, an astigmatism drawing and a distortion aberration drawing in the mid-range focal length situation; and FIGS. 6(C), 7(C), 8(C), 9(C) and 10(C) denotes a spherical aberration drawing, an astigmatism drawing and a distortion aberration drawing in the longest focal length situation.

In each spherical aberration drawing, a solid line d denotes d-line; a one-dot chain line g denotes g-line, a two-dot chain line c denotes c-line and respective lines respectively illustrate the spherical aberration amount (mm). The dotted line SC denotes the deficit amount (mm) of the sine condition.

In the each astigmatism drawing, the solid line DS and dotted line DM respectively denote the astigmatism amounts (mm) at d-line on the sagittal surface and the meridional surface.

In each distortion aberration drawing, the solid line denotes the distortion (%) at d-line.

The vertical axis of the spherical aberration drawing denotes F number (FNO) and the vertical axes in the aspherical aberration drawing and the distortion aberration drawing respectively denote the maximum image height Y'.

The values corresponding to the parameters defined in respective conditional formulas (1)-(5) in the respective numeral embodiments 1-5 will be shown in the following table.

TABLE 6

Conditional Formula Table

| Conditional Formula | (1) Nd | (2) or (3) νd | (4) \|φLn/φW\| | (5) Dp/fW |
|---|---|---|---|---|
| Numeral Embodiment 1 | 1.8441 | 26.4 | 0.540 | 1.19 |
| Numeral Embodiment 2 | 2.0000 | 16.0 | 0.568 | 1.19 |
| Numeral Embodiment 3 | 1.8100 | 37.6 | 0.597 | 1.04 |
| Numeral Embodiment 4 | 1.8141 | 37.1 | 0.702 | 1.07 |
| Numeral Embodiment 5 | 1.8127 | 33.0 | 0.607 | 1.06 |

While the preferred embodiments of the present invention have been described using specific terms, such description is for illustrative purpose only, and it is to be understood that changes and variations may be made without departing from the spirit or scope of the appended claims.

What is claimed is:

1. A variable power optical system for forming an optical image of a subject on an image pickup surface of an image pickup device, comprising:
   a plurality of lens groups;
   wherein a first lens group of the plurality of lens groups which is the most nearest to the subject has a negative refractive power, wherein the first lens group includes:
a reflective optical element for bending a light path; and
an only lens which is provided on a subject side of the reflective optical element and consists of a single negative lens,
wherein an axial distance between the first lens group and the image pickup surface changes when varying a power of the variable power optical system, and a refractive index and an Abbe number of the negative lens satisfy the following relationship:

Nd>1.81 vd<40 wherein:
Nd is the refractive index at d-line of the negative lens;
vd is the Abbe number of the negative lens.

2. The variable power optical system of claim 1, wherein a refractive power of the negative lens satisfies the following relationship:

0.47<|φLn/φW|<1.50 wherein:
φLn is the refractive power of the negative lens;
φW is a refractive power of whole of the variable power optical system when the variable power optical system is at the shortest focal length.

3. The variable power optical system of claim 1, wherein the first lens group includes a cemented lens on an image side of the reflective optical element, the cemented lens consisting of a positive lens and a negative lens.

4. The variable power optical system of claim 1, wherein the negative lens includes an aspherical surface.

5. The variable power optical system of claim 1, further comprising:
a second lens group on an image side of and immediately adjacent to the first lens group, a last surface of the second lens group including an aspherical surface.

6. The variable power optical system of claim 1, further comprising:
a second lens group on an image side of and immediately adjacent to the first lens group, the second lens group including a diaphragm, a positive lens, a cemented lens consisting of a positive lens and a negative lens and a meniscus lens in this order from the subject.

7. An image pickup apparatus, comprising:
a variable power optical system for forming an optical image of a subject on an image pickup surface of an image pickup device,
wherein the variable power optical system includes:
a plurality of lens groups;
wherein a first lens group of the plurality of lens groups which is the most nearest to the subject has a negative refractive power,
wherein the first lens group includes:
a reflective optical element for bending a light path; and
an only lens which is provided on a subject side of the reflective optical element and consists of a single negative lens,
wherein an axial distance between the first lens group and the image pickup surface changes when varying a power of the variable power optical system, and a refractive index and an Abbe number of the negative lens satisfy the following relationship:

Nd>1.81 vd<40 wherein:
Nd is the refractive index at d-line of the negative lens;
vd is the Abbe number of the negative lens.

8. A variable power optical system for forming an optical image of a subject on an image pickup surface of an image pickup device, comprising:
a plurality of lens groups;
wherein a first lens group of the plurality of lens groups which is the most nearest to the subject has a negative refractive power,
wherein the first lens group includes:
a reflective optical element for bending a light path; and
at least a negative lens,
wherein an axial distance between the first lens group and the image pickup surface changes when varying a power of the variable power optical system, and a refractive index and an Abbe number of the negative lens satisfy the following relationship:

Nd>1.81 vd<32 wherein:
Nd is the refractive index at d-line of the negative lens;
vd is the Abbe number of the negative lens.

9. The variable power optical system of claim 8, wherein a refractive power of the negative lens satisfies the following relationship:

0.47<|φLn/φW|<1.50 wherein:
φLn is the refractive power of the negative lens;
φW is a refractive power of whole of the variable power optical system when the variable power optical system is at the shortest focal length.

10. The variable power optical system of claim 8, wherein the first lens group includes a cemented lens on an image side of the reflective optical element, the cemented lens consisting of a positive lens and a negative lens.

11. The variable power optical system of claim 8, wherein the negative lens includes an aspherical surface.

12. The variable power optical system of claim 8, further comprising:
a second lens group on an image side of and immediately adjacent to the first lens group, a last surface of the second lens group including an aspherical surface.

13. The variable power optical system of claim 8, further comprising:
a second lens group on an image side of and immediately adjacent to the first lens group, the second lens group including a diaphragm, a positive lens, a cemented lens consisting of a positive lens and a negative lens and a meniscus lens in this order from the subject.

14. An image pickup apparatus, comprising:
a variable power optical system for forming an optical image of a subject on an image pickup surface of an image pickup device,
wherein the variable power optical system comprises:
a plurality of lens groups;
wherein a first lens group of the plurality of lens groups which is the most nearest to the subject has a negative refractive power,
wherein the first lens group includes:
a reflective optical element for bending a light path; and
at least a negative lens,
wherein an axial distance between the first lens group and the image pickup surface changes when varying a power of the variable power optical system, and a refractive index and an Abbe number of the negative lens satisfy the following relationship:

$Nd > 1.81$ $vd < 32$ wherein:

Nd is the refractive index at d-line of the negative lens;

vd is the Abbe number of the negative lens.

* * * * *